United States Patent
Schultz et al.

(10) Patent No.: US 10,889,505 B2
(45) Date of Patent: Jan. 12, 2021

(54) VANADIUM OXIDE COMPOSITIONS AND SYSTEMS AND METHODS FOR CREATING THEM

(71) Applicant: Dimien Inc., Amherst, NY (US)

(72) Inventors: Brian J. Schultz, Lancaster, NY (US); Sean W. Depner, Amherst, NY (US)

(73) Assignee: Dimien, Inc., Amherst, NY (US)

( * ) Notice: Subject to any disclaimer, the term of this patent is extended or adjusted under 35 U.S.C. 154(b) by 0 days.

(21) Appl. No.: 15/537,878

(22) PCT Filed: Dec. 21, 2015

(86) PCT No.: PCT/US2015/067047
§ 371 (c)(1),
(2) Date: Jun. 19, 2017

(87) PCT Pub. No.: WO2016/100967
PCT Pub. Date: Jun. 23, 2016

(65) Prior Publication Data
US 2017/0369330 A1    Dec. 28, 2017

Related U.S. Application Data

(60) Provisional application No. 62/094,639, filed on Dec. 19, 2014.

(51) Int. Cl.
*C01G 31/02* (2006.01)
*C09C 1/00* (2006.01)
(Continued)

(52) U.S. Cl.
CPC ............ *C01G 31/02* (2013.01); *C09C 1/0006* (2013.01); *C09D 1/00* (2013.01); *C09D 5/004* (2013.01);
(Continued)

(58) Field of Classification Search
CPC .. C01G 31/00–02; C09C 1/0006; C09D 1/00; C09D 5/004; D06M 11/47;
(Continued)

(56) References Cited

U.S. PATENT DOCUMENTS 3,463,321 A * 8/1969 Vaningen ........... B01D 33/0346
209/233
2002/0064497 A1* 5/2002 Horne ..................... C01G 31/02
423/594.8
(Continued)

FOREIGN PATENT DOCUMENTS

WO    WO-2012001636 A1 * 1/2012 ............. B82Y 30/00

OTHER PUBLICATIONS

Yang, Thomas C-K., et al. "Manufacture and characterization of sol-gel V1-x-yWxSiyO2 films for uncooled thermal detectors." Sensors and Actuators A: Physical 140.2 (2007): 194-199.*
(Continued)

*Primary Examiner* — Richard M Rump
(74) *Attorney, Agent, or Firm* — Jonathan M. D'Silva; MMI Intellectual Property

(57) ABSTRACT

A system for creating targeted vanadium oxide ($VO_2$) nanoparticle compositions comprising a stock reaction mixture that is a fluid combination of at least one vanadium source combined with at least one dopant source. Each dopant source contains at least one target dopant element. The ratio of the number of vanadium atoms in the vanadium source to the number of target dopant element atoms in the dopant source is less than or equal to 10:1. A solvent that is compatible with said stock reaction mixture is selected. A pressure regulator increases the pressure of the solvent and the stock reaction mixture to between 0 and 5,000 psi. A heating element increases the temperature of the solvent to between 50 and 500° C. A mixing unit receives and mixes
(Continued)

a continuous flow of stock reaction mixture with solvent to heat the stock reaction mixture and initiate formation of the targeted vanadium oxide ($VO_2$) nanoparticle composition.

49 Claims, 5 Drawing Sheets

(51) Int. Cl.
    *C09D 5/33*     (2006.01)
    *C09D 1/00*     (2006.01)
    *D06M 11/47*     (2006.01)
    *D06M 23/08*     (2006.01)

(52) U.S. Cl.
CPC ............ *D06M 11/47* (2013.01); *D06M 23/08* (2013.01); *C01P 2002/54* (2013.01); *C01P 2002/72* (2013.01); *C01P 2002/77* (2013.01); *C01P 2002/82* (2013.01); *C01P 2002/84* (2013.01); *C01P 2002/88* (2013.01); *C01P 2004/03* (2013.01); *C01P 2006/32* (2013.01); *C01P 2006/60* (2013.01); *C03C 2217/218* (2013.01)

(58) Field of Classification Search
CPC . D06M 23/08; C01P 2002/54; C01P 2002/77; C01P 2002/82; C01P 2002/84; C01P 2002/88; C01P 2004/03; C01P 2006/23; C01P 2006/60; C03C 2217/218
See application file for complete search history.

(56) References Cited

U.S. PATENT DOCUMENTS

| | | | |
|---|---|---|---|
| 2006/0247446 A1* | 11/2006 | Neto | B01J 23/002 549/249 |
| 2010/0283005 A1* | 11/2010 | Pickett | C09K 11/02 252/301.6 S |
| 2013/0101848 A1* | 4/2013 | Banerjee | C09K 9/00 428/402 |
| 2013/0344335 A1* | 12/2013 | Gao | C01G 31/02 428/402 |

OTHER PUBLICATIONS

Ji, Shidong, Feng Zhang, and Ping Jin. "Selective formation of VO2 (A) or VO2 (R) polymorph by controlling the hydrothermal pressure." Journal of Solid State Chemistry 184.8 (2011): 2285-2292.*
Shi, Jianqiu, et al. "Preparation and thermochromic property of tungsten-doped vanadium dioxide particles." Solar energy materials and solar cells 91.19 (2007): 1856-1862.*
Kwon, Soon Gu, and Taeghwan Hyeon. "Formation mechanisms of uniform nanocrystals via hot-injection and heat-up methods." Small 7.19 (2011): 2685-2702.*

* cited by examiner

Low Temperature Monoclinic Phase    High Temperature Rutile Phase

VANADIUM OXIDE COMPOSITIONS AND SYSTEMS AND METHODS FOR CREATING THEM

This application takes priority from PCT Application PCT/US2015/06747 filed on Dec. 19, 2015, which takes priority from U.S. Provisional Patent Application No. 62/094,639 filed on Dec. 19, 2014, both of which are incorporated herein by reference.

BACKGROUND

Vanadium oxide has a large number of oxidation states. The most notable for thermochromic properties is vanadium (IV) oxide ($VO_2$) where vanadium has a cationic charge of +4 and oxygen has an anionic charge of −2. At room temperature, $VO_2$ is infrared (IR) transparent but upon heating past its transition temperature of approximately 67° C., the material becomes IR reflective. This property is an extension of $VO_2$'s metal-to-insulator (MIT) phase transition. $VO_2$ can manifest in several crystal structures (monoclinic, triclinic, rutile), with monoclinic ($VO_2(M)$) and rutile ($VO_2(R)$) being the two phases contributing to the thermochromic switch between infrared transparent and reflecting states, respectively. The representative crystal structures of $VO_2(M)$ and $VO_2(R)$ are depicted in FIG. 1. The vanadium atoms in the insulating $VO_2(M)$ crystal state dimerize (i.e., form zig-zag pairs), creating chains with alternating bond distances of approximately 2.65 and 3.12 angstroms. These dimer chains create a band gap in the $VO_2$ electronic structure making it electrically insulating and IR transparent. When $VO_2$ is heated above the transition temperature, the dimers rearrange and form a linear chain in the tetragonal phase, $VO_2(R)$ creating one V—V bond length of 2.85 angstroms. Thereby eliminating the band gap in the electronic structure and creating a more metallic conducting phase that is IR reflective.

The problem with the thermochromic transition temperature is that it occurs near 67° C., which is about 154.4° F., too far above room temperature to be an effective dynamic building material to control heat gain and/or thermal gradients. In other words, 154° F. is just too hot to be considered a comfortable indoor temperature in living spaces. What is presented is a novel $VO_2$ composition and method that specifically targets lowering the transition temperature for applications that are more likely to be encountered in every day applications.

SUMMARY

A system and a method for creating targeted vanadium oxide ($VO_2$) nanoparticle compositions is presented. The system comprises a stock reaction mixture that is a fluid combination of at least one vanadium source combined with at least one dopant source. Each of the at least one dopant source contains at least one target dopant element and the ratio of the number of vanadium atoms in the vanadium source to the number of target dopant element atoms in the dopant source is less than or equal to 10:1. A selected solvent that is compatible with the stock reaction mixture is also provided.

A pressure regulator increases the pressure of the solvent and the stock reaction mixture to between 0 and 5,000 psi. A heating element increases the temperature of the solvent to between 50 and 500° C. A mixing unit receives and mixes a continuous flow of stock reaction mixture with solvent to heat the stock reaction mixture and initiate formation of the targeted vanadium oxide ($VO_2$) nanoparticle composition.

Some embodiments of the system add chemical additives that are delivered downstream of the mixing unit. The function of said chemical additive could be for surface treating the targeted vanadium oxide ($VO_2$) nanoparticle composition, halting formation of the targeted vanadium oxide ($VO_2$) nanoparticle composition, changing dispersability of the targeted vanadium oxide ($VO_2$) nanoparticle composition, limiting agglomeration of the targeted vanadium oxide ($VO_2$) nanoparticle composition, or encapsulating entirely or partially the targeted vanadium oxide ($VO_2$) nanoparticle composition with an additional material.

Some embodiments of the system could include a cooling element located downstream of the mixing unit. Particle filters could be used to capture the formed targeted vanadium oxide ($VO_2$) nanoparticle composition. Ultrasonic agitators may also be used in conjunction with the particle filters.

The solvent used may be water, isopropanol, carbon dioxide, ethanol, toluene, anisole, ethylene glycol, methanol, and any combination thereof. The vanadium source may be vanadium (V) oxide, vanadium (IV) oxide, vanadium oxides, vanadium, vanadyls ($VO(OR)_x$), vanadium oxalates, vanadium alkoxides ($V(OR)_x$), vanadium halides, vanadium nitrates, vanadium nitrites, vanadium sulfates, vanadium salts, and other vanadium containing compounds. The dopant source may be silicon dioxide, silanes, manganese dioxide, tetraethyl orthosilicate, silicates, ammonium phosphate monobasic, ammonium phosphate dibasic, phosphoric acid, ammonium hydroxide, phosphorous containing acids, tungstic acid, tungsten alkoxides, tungsten halides, tungsten nitrates, tungsten nitrites, tungsten organometallic compounds, molybdic acid, molybdenum alkoxides, molybdenum halides, molybdenum nitrates, molybdenum nitrites, molybdenum organometallic compounds, titanium dioxide, titanium alkoxides, Tyzor™, titanium halides, titanium nitrates, titanium nitrites, titanium organometallic compounds, tin dioxide, tin salts, tin alkoxides, tin halides, tin nitrates, tin nitrites, tin organometallic compounds, iron oxide, iron alkoxides, iron halides, iron nitrates, iron nitrites, iron organometallic compounds, tin oxide, germanium oxide, germanium alkoxides, germanium organometallic compounds, germanium halides, germanium nitrates, germanium nitrites, dextrose, graphite, or graphene.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

Figure 1:
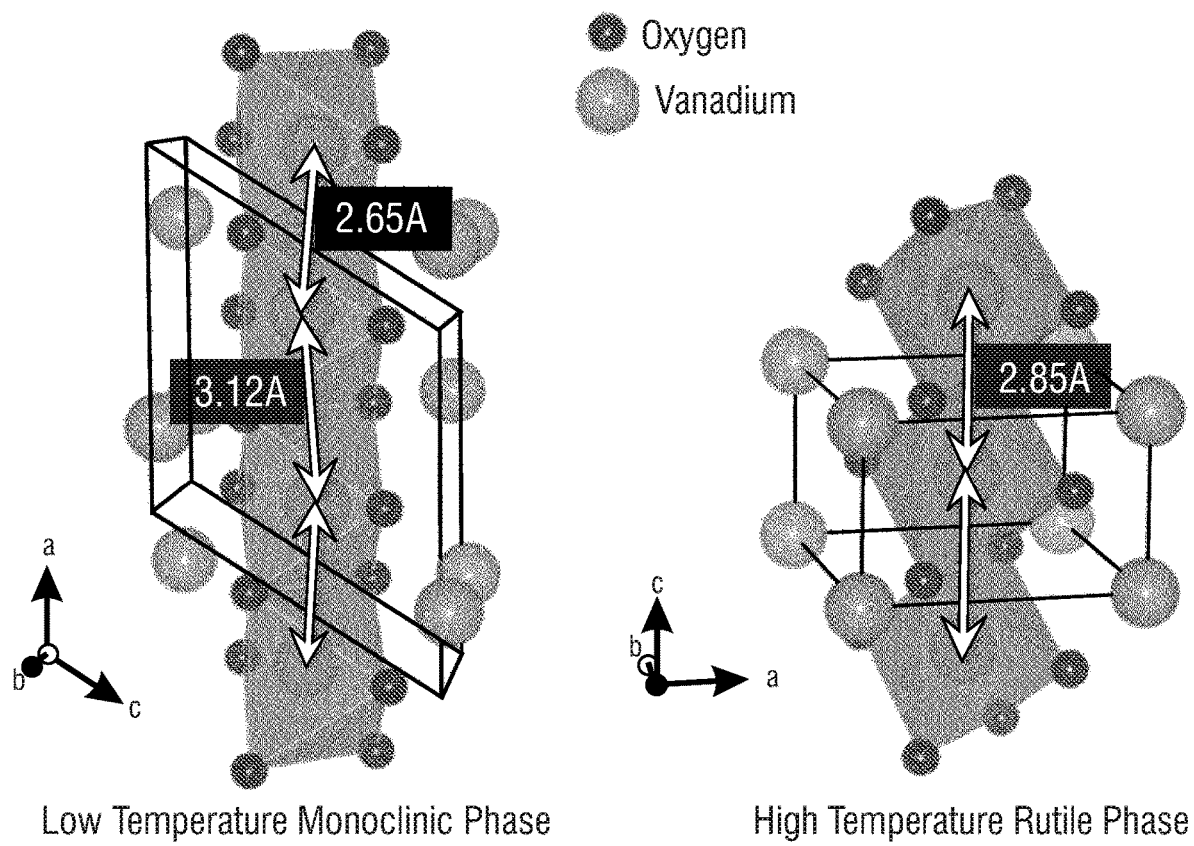
FIG. 1 depicts crystal structures of the low-temperature $VO_2(M)$ and high-temperature $VO_2(R)$ phases.

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

Figure 2:
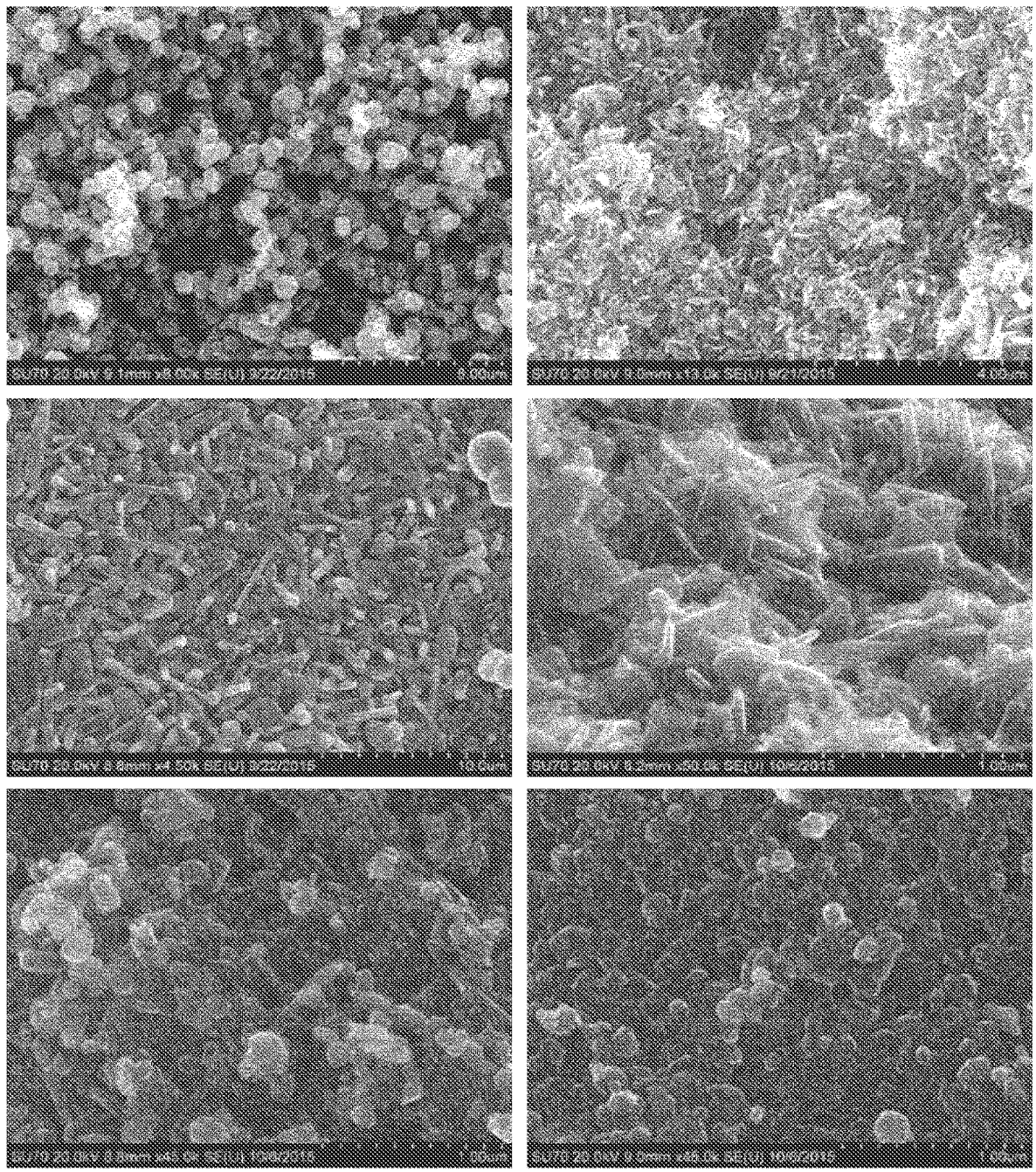
FIG. 2 shows scanning electron microscopy images of various $VO_2$ morphologies produced via the continuous flow hydrothermal method described herein.

To be considered a nanomaterial, one dimension of the $VO_2$ crystal needs to be less than 100 nm. This includes morphologies such as films, particles, grains, wires, rods, sheets, spheres, etc., examples of which are shown in FIG. 2. Scaling the dimensions of the crystal from bulk to 100 nm or less can change the energetics of the crystal system. The number of atoms on the surface of the nanoparticles becomes a significant portion of the overall number atoms in the system compared to the bulk. In other words, as the crystallites decease in size, the number of surface atoms relative to internal atoms increases dramatically. Due to the difference in energetics between surface and bulk atoms, a smaller crystallite typically prefers the more symmetric phase, in this case the phase of $VO_2(R)$. Therefore, as the crystallites become smaller, this stabilizes $VO_2(R)$, lowering the transition temperature between $VO_2(M)$ and $VO_2(R)$. In this way, the transition temperature from $VO_2(M)$ to $VO_2(R)$ can be manipulated.

Another method used to lower the transition temperature of $VO_2$ is to substitutionally replace a portion of vanadium atoms with cationic metal atoms such as tungsten, molybdenum, niobium, etc. creating $\beta xV1-xO2$ materials. In chemistry this is referred to as doping. $\beta$ in the chemical compound $\beta xV1-xO2$ is an atom or mixture of atoms that substitutionally replace vanadium atoms as described previously. These elements, used singularly, and in combination with each other, locally stabilize the $VO_2(M)$ or $VO_2(R)$ phases within the $VO_2$ lattice, regardless of the overall crystal structure of the $VO_2$ lattice. These doped atoms with a local geometry serve as a nucleation point of the phase transformation, lowering the energy required to transition from one phase to another, and thus lowering the transition temperature.

Similarly, the transition temperature of $VO_2$ can be manipulated by substitutionally replacing a portion of the oxygen atoms with anionic atoms such as fluorine, sulfur, bromine, nitrogen, chlorine, etc. to similarly stabilize $VO_2$ (M) or $VO_2(R)$, as described above, to change the phase transition temperature.

For example, referring to the crystal structures of the low-temperature $VO_2(M)$ and high-temperature $VO_2(R)$ phases shown in FIG. 1, the smaller sphere represents oxygen atoms and the larger sphere represents vanadium atoms. The vanadium or oxygen atoms would be substitutionally replaced with another element (described in more detail herein) to manipulate the transition temperature of the $VO_2$ nanoparticle.

Targeted vanadium oxide ($VO_2$) nanoparticle compositions can be manufactured in a number of ways, but essentially require the creation of a stock reaction mixture that is a fluid combination of at least one vanadium source combined with at least one dopant source. Each component is selected based on the intended targeted vanadium oxide ($VO_2$) nanoparticle composition. Typically, each dopant source contains at least one target dopant element. Typically, the ratio of the number of vanadium atoms in the vanadium source to the number of target dopant element atoms in the dopant source is less than or equal to 10:1. In some instances the target dopant element comprises an atomic concentration less than 20% of the targeted vanadium oxide ($VO_2$) nanoparticle composition.

Vanadium sources comprise vanadium (V) oxide, vanadium (IV) oxide, vanadium oxides, vanadium, vanadyls ($VO(OR)_x$), vanadium oxalates, vanadium alkoxides ($V(OR)_x$), vanadium halides, vanadium nitrates, vanadium nitrites, vanadium sulfates, vanadium salts, and other vanadium containing compounds.

Dopant sources comprise silicon dioxide, silanes, manganese dioxide, tetraethyl orthosilicate, silicates, ammonium phosphate monobasic, ammonium phosphate dibasic, phosphoric acid, ammonium hydroxide, phosphorous containing acids, tungstic acid, tungsten alkoxides, tungsten halides, tungsten nitrates, tungsten nitrites, tungsten organometallic compounds, molybdic acid, molybdenum alkoxides, molybdenum halides, molybdenum nitrates, molybdenum nitrites, molybdenum organometallic compounds, titanium dioxide, titanium alkoxides, Tyzor™, titanium halides, titanium nitrates, titanium nitrites, titanium organometallic compounds, tin dioxide, tin salts, tin alkoxides, tin halides, tin nitrates, tin nitrites, tin organometallic compounds, iron oxide, iron alkoxides, iron halides, iron nitrates, iron nitrites, iron organometallic compounds, tin oxide, germanium oxide, germanium alkoxides, germanium organometallic compounds, germanium halides, germanium nitrates, germanium nitrites, dextrose, graphite, graphene and other compounds containing target dopant elements.

Given the proper conditions, the stock reaction mixture by itself could react to form vanadium oxide ($VO_2$) compositions; however, these compositions will likely not be in the nanoparticle size range and will likely have transition temperatures that are too high, near 67° C. Some diluting solvent must be added to the mixture and then the required conditions applied to initiate particle formation and to limit the size to the nanoparticle range. Acceptable solvents include water, isopropanol, carbon dioxide, ethanol, toluene, anisole, ethylene glycol, methanol, and any combination thereof. Typically, the ratio of the solvent to the stock reaction mixture when mixing said stock reaction mixture with said solvent is greater than or equal to 1:2.

Processes that use an aqueous or water-based stock reaction mixture heated in a reaction system that can regulate pressure are referred to as hydrothermal reactions. This process can also be performed in solvothermal reactions where water is replaced with a solvent such as isopropanol, carbon dioxide, ethanol, toluene, anisole, ethylene glycol, methanol, etc. Alternatively, any combination of the hydrothermal and solvothermal based stock reaction mixtures can be used in this reaction process.

Figure 3:
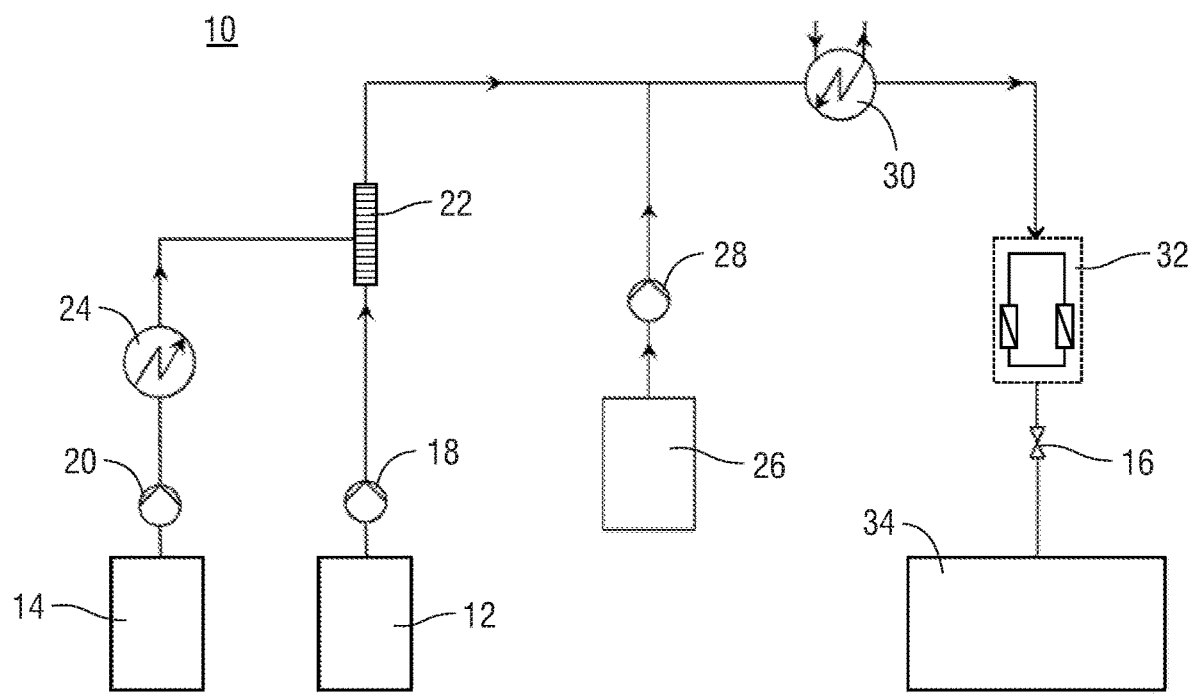
FIG. 3 is a schematic of an example continuous flow system used to produce nanoparticles.

The targeted vanadium oxide ($VO_2$) nanoparticle compositions can be produced in a continuous flow reaction system 10 that is illustrated, for example, in FIG. 3. A stock reaction mixture that is a fluid combination of at least one vanadium source combined with at least one dopant source is located in a first reservoir 12. Each of the at least one dopant source contains at least one target dopant element. The ratio of the number of vanadium atoms in the vanadium source to the number of target dopant element atoms in the dopant source is less than or equal to 10:1. A selected solvent that is compatible with the stock reaction mixture is located in a second reservoir 14.

In the system shown in FIG. 1, a back pressure regulator 16 is used to increase the pressure in the continuous flow reaction system 10 to between 0 and 5,000 psi. However, it should be understood that the pressure could be regulated by other means. For example, each reservoir could have independent pressure regulation. In any case, the pressure of the solvent and the stock reaction mixture is set to between 0 and 5,000 psi, depending on the reaction required to achieve the targeted vanadium oxide ($VO_2$) nanoparticle composition.

The stock reaction mixture is pumped from the first reservoir 12 by a first pump 18 and the solvent is pumped from the second reservoir 14 by a second pump 20 to a mixing unit 22. On the way to the mixing unit 22, the solvent passes through a heating element 24 that increases the temperature of the solvent to between 50 and 500° C.; essentially the solvent is heated at pressure to supercritical or sub-supercritical levels. The type, configuration, and even the use of the first pump 18 and the second pump 20 is dependent of the specific configuration of the continuous flow reaction system 10 and may be varied as needed.

The mixing unit 24 receives and mixes a continuous flow of the stock reaction mixture with the heated solvent. This mixing under pressure of the supercritically or sub-supercritically heated solvent with the room temperature stock reaction mixture initiates formation of the targeted vanadium oxide ($VO_2$) nanoparticle composition almost instantaneously. Residence or dwell time for $VO_2$ crystallization and growth is between 0 seconds and 60 minutes at elevated temperatures but it typically less than 5 minutes and often less than 1 minute.

An optional third reservoir 26 that contains a chemical additive that can be delivered with a third pump 28 downstream of the mixing unit 24 may be provided. The chemical additive could be used for any of a variety of purposes from treating the targeted vanadium oxide ($VO_2$) nanoparticle composition, halting formation of the targeted vanadium oxide ($VO_2$) nanoparticle composition, changing dispersability of the targeted vanadium oxide ($VO_2$) nanoparticle composition, limiting agglomeration of the targeted vanadium oxide ($VO_2$) nanoparticle composition, and encapsulating entirely or partially the targeted vanadium oxide ($VO_2$) nanoparticle composition with an additional material.

Whether or not a chemical additive is added to the targeted vanadium oxide ($VO_2$) nanoparticle composition, a cooling heat exchanger 30 could be used to reduce the temperature of the solution prior to recovery of the formed nanoparticles. The nanoparticles are passed through a particle filter system 32 that may include an ultrasonic agitator before passing to a collection area 34. Ultrasonic agitation at filtration ensures that the particles do not agglomerate and cause unwanted flow blockages in the system.

In some instances, further post-processing of the isolated and collected targeted vanadium oxide ($VO_2$) nanoparticle composition may be required. Some dopants may need to be "activated" and impurity phases of $VO_2$ may need to be removed. Therefore a post-annealing step is often required. The impurity phases include, but are not limited to $VO_2(A)$, $VO_2(B)$, and $VO_2(M2)$. The isolated targeted vanadium oxide ($VO_2$) nanoparticle composition is preferably annealed in an inert or open atmosphere at temperature ranges between 100-850° C. Additionally, the isolated targeted vanadium oxide ($VO_2$) nanoparticle composition can be milled and pulverized to a uniform size distribution via commercially available mills.

The resulting isolated targeted vanadium oxide ($VO_2$) nanoparticle composition is intimately mixed with a polymer system. Polymers that can be used include polyacrylics, polyacrylates, polyeurothanes, polyesters, co-polyesters, polyvinyls, polycarbonates, polyaramids, polyamids, polyepoxies, polystyrenes, polyolefins, polyfluoropolymers, co-polymers, any monomer precursors to the polymers listed above, and/or any combination thereof. The powder is intimately mixed with the polymer via solid-solid, solid-liquid, or liquid-liquid mixing methods. Common methods include plastic compounding, homogenization, ultra-sonication, blending, dispersion, ball milling and mixing, stirring, grinding, etc. In addition to the polymer system, additives such as binders, surfactants, plasticizers, core-shell chemistries, stabilizers, curing agents, and other surface modifiers are often employed to achieve the best composite formulation.

The targeted vanadium oxide ($VO_2$) nanoparticle compositions can also be produced in a batch system. A stock reaction mixture is formulated in a batch container. Some vanadium sources and dopant sources require the addition of an acidic source to initiate the formation of the required stock reaction mixture. The container is sealed and, depending on the constituents of the stock reaction mixture, allowed to age for 12-24 hours until the stock reaction mixture appears homogenous. If an acidic source is used, a basic source is added to neutralize the stock reaction mixture to a pH range of 5-9. The neutralization process allows the use of conventional stainless steel processing equipment rather than equipment manufactured from specialized materials that resist corrosion in acidic or basic solutions. Occasionally, depending on the sources used, pH neutralization causes undesirable and unwanted products. In those instances, a reaction mixture that is not pH neutralized can be used as the stock reaction mixture. Without neutralization, a coated reaction vessel is typically employed to prevent steel corrosion and the presence of impurities in the final product. The process has been described as the stepwise addition of raw materials sources, but the raw materials can be added together to produce the stock reaction mixture in almost any order.

The stock reaction mixture is heated between 50-500° C. at pressure between 0-5000 psi for a period of time lasting 0-168 hours. In some cases, the reaction occurs instantaneously during mixing, hence the 0 hour reaction period. The resulting targeted vanadium oxide ($VO_2$) nanoparticle compositions are isolated using standard methods.

Whatever method of production is used, a variety of targeted vanadium oxide ($VO_2$) nanoparticle compositions are possible. A $VO_2$ particle with the general composition of $\alpha_x V_{1-x} O$, where $\alpha$ is a cationic (positively charged) non-metal such as silicon (Si), phosphorous (P), nitrogen (N), carbon (C), sulfur (S), germanium (Ge), tin (Sn), and/or any combination thereof that substitutionally replaces a vanadium atom in the targeted vanadium oxide ($VO_2$) nanoparticle composition. In literature, silicon (Si), germanium (Ge), and tin (Sn) are also referred to as metalloid elements due to their close proximity to metal elements on the periodic table, but no standard definition exists for metalloids. The non-metal atoms that substitutionally replaced vanadium atoms change the transition temperature. These cationic elements also change the electronic structure, as they have different ionic charges and electronegativities than vanadium.

The targeted vanadium oxide (VO$_2$) nanoparticle composition could also comprise the general composition of $\alpha_x\beta_y V_{1-x-y}O_2$, where α is a cationic (positively charged) non-metal or metalloid element as previously described and β is a cationic (positively charged) metal or metalloid element such as tungsten (W), molybdenum (Mo), silver (Ag), nickel (Ni), lead (Pb), potassium (K), sodium (Na), cesium (Cs), strontium (Sr), barium (Ba), calcium (Ca), niobium (Nb), chromium (Cr), aluminum (Al), iron (Fe), titanium (Ti), zirconium (Zr), hafnium (Hf), tantalum (Ta), scandium (Sc), gallium (Ga), copper (Cu), cobalt (Co), gold (Au), tin (Sn), manganese (Mn), bismuth (Bi), rare-earth elements cations, or any combination thereof, and β substitutionally replaces another vanadium atom in the VO$_2$ nanoparticle.

Combinations of $\alpha_x\beta_y V_{1-x-y}O_2$ reduce the hysteresis, or the gap, between the heating (VO$_2$ (M) to VO$_2$ (R)) and cooling (VO$_2$ (R) to VO2(M)). The hysteresis reduction is particular apparent with the combination of titanium (Ti) with tungsten (W) in Ti$_x$W$_y$V$_{1-x-y}$O2 or silicon (Si) with tungsten (W) in Si$_x$W$_y$V$_{1-x-y}$O$_2$. The mechanism is admittedly not well understood but the local dopant bond geometry and electronic structure modifications as a result of the dopant influence the phase change temperature and hysteresis magnitude.

The targeted vanadium oxide (VO2) nanoparticle composition could also comprise the general composition $\alpha_x V_{1-x}\gamma_z O_{2-z}$, where α is the aforementioned non-metal as previously described and γ is an anionic (negatively charged) element such as nitrogen (N), phosphorous (P), Sulfur (S), fluorine (F), chlorine (Cl), bromine (Br), iodine (I), carbon (C), and/or any combination thereof that substitutionally replaces an oxygen atom.

The targeted vanadium oxide (VO$_2$) nanoparticle composition could also comprise the general composition of $\alpha_x\beta_y V_{1-x-y}\gamma_z O_{2-z}$, where α is a cationic (positively charged) non-metal or metalloid element that substitutionally replaces a vanadium atom in the VO$_2$ nanoparticle as previously described, β is another cationic metal or metalloid element that substitutionally replaces another vanadium atom in the VO$_2$ nanoparticle as previously described, and γ is an anionic element that substitutionally replaces an oxygen atom as previously described.

Nanosized VO$_2$ having one, or more, of the three dimensions of the particle below 100 nm may be produced using the system and methods described herein to lower the thermochromic transition temperature. This is performed by starting with a vanadium oxide source and adding an organic or inorganic acid to form a VO(OR)$_x$ or V(OR)$_x$ precursors, where R is an organic acid and x ranges from 1-6. Alternatively, a vanadyl or metavanadate from a materials supplier can also be sourced. Furthermore, the source dopant materials to produce a VO$_2$ particle with the general composition of $\alpha_x V_{1-x}O_2$ are also added to the reaction mixture. Depending upon process conditions, the reaction vessel is occasionally lined with a protective coating consisting of Teflon, polytetrafluoroethylene, Silcotek Silcolloy®, Silcotek Dursan®, gold, tantalum, Tantaline®, platinum, palladium, silver, glass, quartz, other noble metals, amorphous silicon, silicon oxide, or combinations thereof. Any combination of the targeted vanadium oxide (VO$_2$) nanoparticle compositions described above can be created where phase, crystallite size, and composition (doping) of the VO$_2$ nanoparticles are altered to achieve VO$_2$ with the best properties for specific applications. A secondary shell, known as a nanoparticle core-shell structure, may also be applied to encapsulate the targeted vanadium oxide (VO$_2$) nanoparticle composition. Common shells include silica, SiO$_2$, and TiO$_2$. The shell provides an inert and durable outer shell with a VO$_2$ core.

Figure 4:
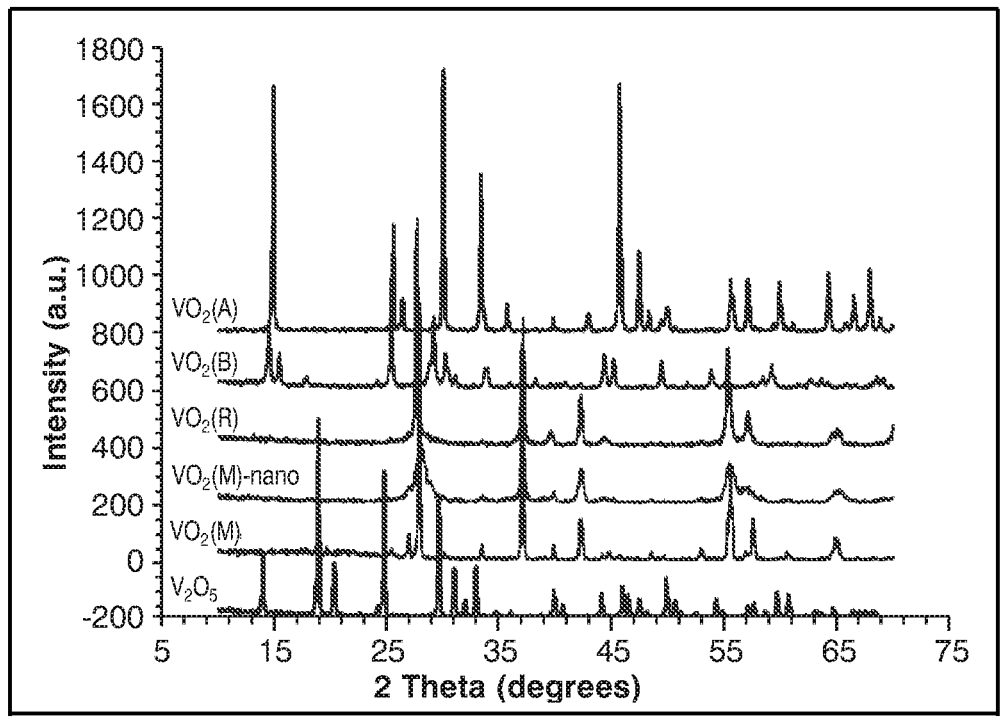
FIG. 4 is a graph of X-ray diffraction (XRD) patterns matching the Joint Committee on Powder Diffraction Standards (JCPDS) database for several crystal phases of $VO_2$.

FIG. 4 shows X-Ray Diffraction (XRD) patterns matching the Joint Committee on Powder Diffraction Standards (JCPDS) database for several crystal phases of VO$_2$ including: V$_2$O$_5$ JCPDS 41-1426, VO$_2$(M) JCPDS 43-1051, VO$_2$(R) JCPDS 76-0677, VO$_2$(B) JCPDS 81-2392, and VO$_2$(A) JCPDS 80-0690, produced from variations of compositions created using the systems and methods described herein. Also shown is a V$_2$O$_5$ XRD pattern, a primary source material, to demonstrate that no V$_2$O$_5$ is present after the reaction. Also shown is nanosized-VO$_2$ (M) that matches JCPDS 43-1051. The peak broadening at 2 Theta values of approximately 28.0, 37.5, and 55.0 degrees when compared to VO$_2$(M) peak widths is a well-known nanomaterial phenomenon in XRD and is generally described by the Scherrer formula. This demonstrates that the size and phase of VO$_2$ particles produced using the production process described herein can be controlled.

Figure 5:
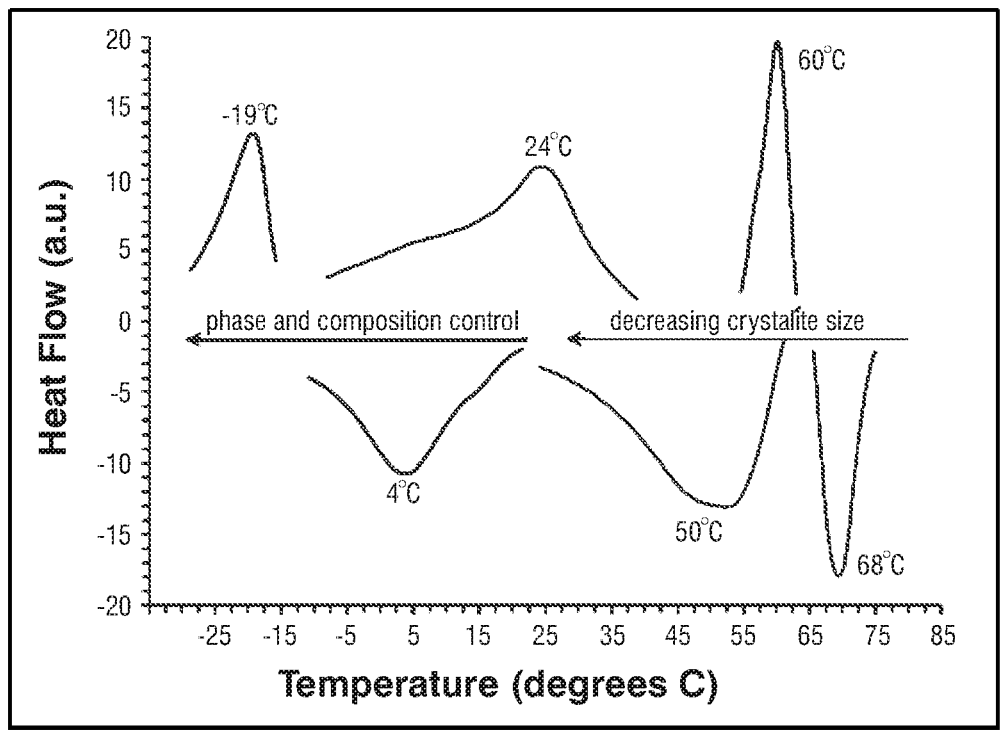
FIG. 5 is a graph of differential scanning calorimetry curves of $VO_2$ metal-to-insulator transitions (MIT)
Figure 6:
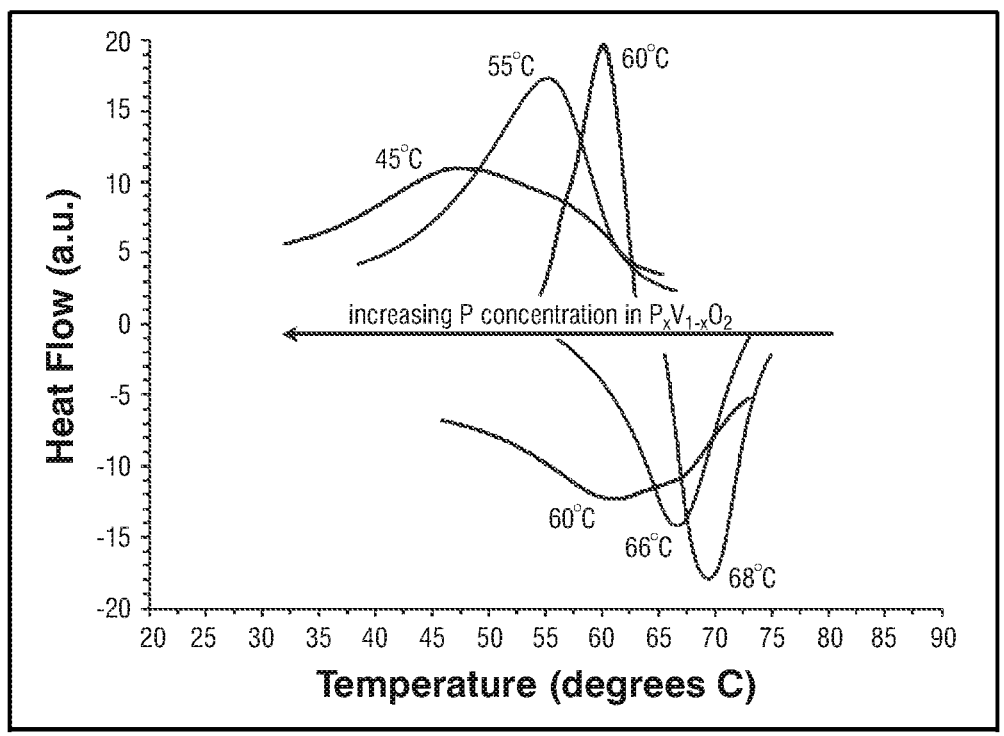
FIG. 6 is another graph of differential scanning calorimetry curves of $VO_2$ metal-to-insulator transitions (MIT)

FIGS. 5 and 6 show differential scanning calorimetry that demonstrates the wide range of transition temperatures producible from the disclosed process via compositional variance, phase variance, and size control. In FIG. 5, differential scanning calorimetry curves of VO$_2$ metal-to-insulator transitions (MIT) are shown. The two curves on the right of the graph with peaks at 60/68° C. are considered to be bulk un-doped VO$_2$. By simply decreasing the crystallite size of the VO$_2$ the transition temperature can be decreased, as represented by the change shown form the two right curves (60/68° C.) to the two middle curves (24/50° C.). Similarly, by controlling phase and composition, the transition can be decreased even further to below 0° C., as shown by the two left curves.

In FIG. 6, differential scanning calorimetry curves of VO$_2$ metal-to-insulator transitions (MIT) are shown. The two right curves with peaks at 60/68° C. are considered to be bulk un-doped VO$_2$. As the amount of non-metal atoms substitutionally replacing vanadium ($\alpha_x V_{1-x}O_2$) are increased, it is clear that the transition temperature is lowered as evidenced by the thermal curves represented. Doping phosphorous into VO$_2$ yields P$_x$V$_{1-x}$O$_2$. As the concentration of phosphorous is increased the transition temperatures are lowered sequentially from 60/68° C. (two right curves), to 55/66° C. (two middle curves), and then to 45/60° C. (two left curves). By controlling the combination of composition, phase, and material size the transition over a broad temperature range can be manipulated from approximately −20 to 70° C. with relatively narrow peak widths.

Figure 7:
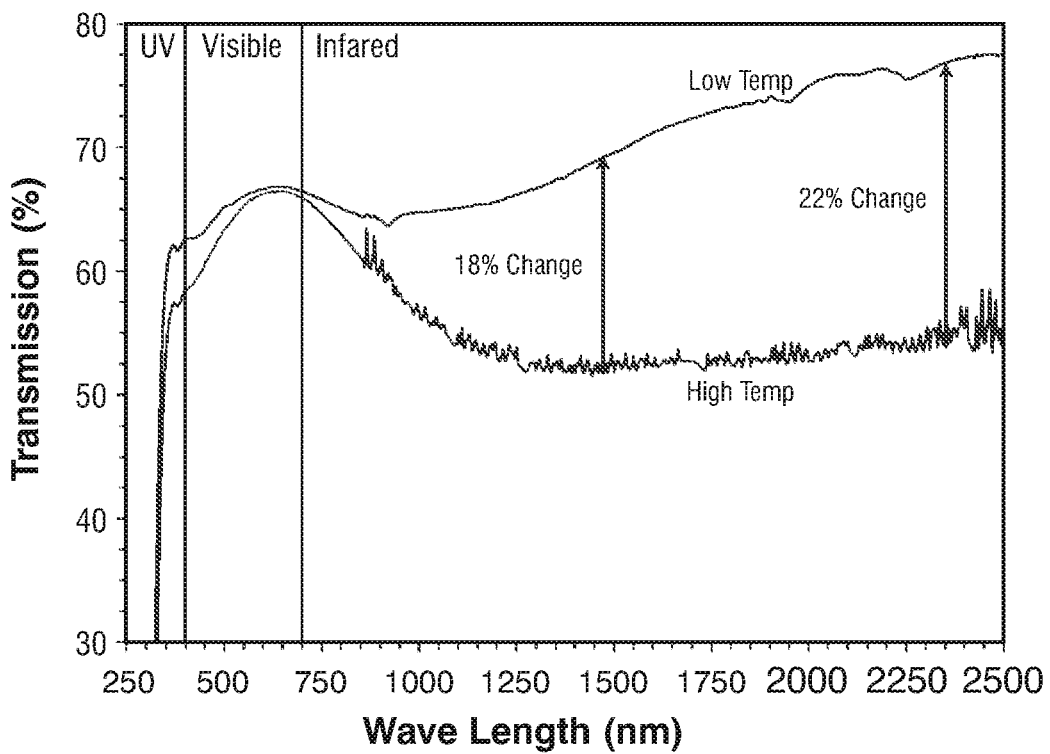
FIG. 7 graphs UV-Vis-NIR transmission spectra where ultra-violet (UV), visible (Vis), and near-infrared (NIR) regions of the solar spectrum are demarcated for reference.

FIG. 7 shows the functional application and operation of an applied window film with VO$_2$ nanoparticles where infrared light is controlled and manipulated based on temperature. UV-Vis-NIR transmission spectra where ultraviolet (UV), visible (Vis), and near-infrared (NIR) regions of the solar spectrum are demarcated for reference. The Low Temp (top line) represents a coated sample in the VO$_2$(M) phase or IR transparent state. The High Temp (bottom line) represents the same coated sample in the VO$_2$(R) phase or IR reflective state. A change in the transmission percentage between Low Temp and High Temp begins near 750 nm and becomes most pronounced near 1500 nm with a magnitude of 22%. Note that a minimal change in the transmission percentage is evidenced in the visible region; therefore, the VO$_2$(M) to VO$_2$(R) phase change is infrared selective.

There are numerous methods to coat/incorporate the targeted vanadium oxide (VO$_2$) nanoparticle compositions into a matrix for end use products where the targeted vanadium oxide (VO$_2$) nanoparticle composition would represent one or more components in such a product. A number of application methods specifically relating to flexible substrates (i.e. polymer films, textiles, papers, etc.), inflexible substrates (i.e. glass, metal, plastic, etc.), and composite formulations (slurry, solid mixtures, inks, pigments, etc.) are presented that can be incorporated into numerous other products:

Surface Modification: Incorporation of the targeted vanadium oxide ($VO_2$) nanoparticle composition into a matrix often requires surface modification chemistries that can include surfactants, surface functionalization, core-shell structures, and liquid-solid or liquid-liquid interface modifications. For example, the targeted vanadium oxide ($VO_2$) nanoparticle compositions can be coated with inert, robust, and non-toxic compounds such as silica or $SiO_2$. The result would be a $VO_2$ core with a thin shell of $SiO_2$ or Si.

Flexible Substrates: The production of flexible thin films in a roll-to-roll production format use such deposition methods as gravure, doctor blade, slot die, Mayer rod (wire bar), wet spray, sputtering, extrusion, electrostatic deposition, etc. It has been determined that the formulations presented herein coat uniformly via gravure, doctor blade, dip, slot die, Mayer rod, and extrusion methods.

Inflexible Substrates: Coating of inflexible substrates is often performed with many of the methods mentioned above for flexible substrates with different in-line processing configurations to accommodate rigid substrates. Specifically these include but are not limited to: chemical vapor deposition, sputtering, sol-gel, dip coating, wet spray, dry spray or electrostatic deposition, Mayer rod (wire bar), extrusion, doctor blade, and pyrolytic processes.

Other Mixtures/Formulations: Wet and dry formulations with the targeted vanadium oxide ($VO_2$) nanoparticle compositions are possible. Wet formulations include but are not limited to slurries, liquid-solid mixtures, sol-gels, paints, inks, resins, dispersions, colloids, and any combination thereof. Dry formulations include but are not limited to solid-solid mixtures, solid solutions, ingots, solid composites, beads, pellets, alloys, filings, powders, polymer composites, solid composites, or any combination thereof.

The targeted vanadium oxide ($VO_2$) nanoparticle compositions have many phases that influence the switch between infrared reflecting and infrared transparent phases. This is an extension of a metal-to-insulator transition. This occurs most notably with the conversion from $VO_2(M)$ to $VO_2(R)$. The switch between these phases occurs with ambient changes in temperature (thermochromic transition), the application of a voltage (electrochromic transition), or with a combination of temperature and applied voltage.

For example, increases in ambient temperature will cause the targeted vanadium oxide ($VO_2$) nanoparticle composition to switch from $VO_2(M)$ to $VO_2(R)$. In another example, a voltage can be applied to a conducting film, glass surface, or device to electronically switch $VO_2(M)$ to $VO_2(R)$. In other words, we envision using ambient temperature fluctuations and/or applied voltages in thin films to drive the switch between $VO_2(M)$ or $VO_2(R)$. It should also be noted, that we may use the material solely in one phase, without the need for a transition, (e.g. a film that is always IR reflective in the $VO_2(R)$ phase).

Through precise control of the targeted vanadium oxide ($VO_2$) nanoparticle composition phase and composition it is possible to manipulate the properties of the IR transparent (insulating phase), IR reflecting (conducting phase), and the transition between these respective phases. Due to this variable control, the targeted vanadium oxide ($VO_2$) nanoparticle compositions may be used in numerous applications taking advantage of the unique IR and electrical properties, including:

1. Building Materials: Targeted vanadium oxide ($VO_2$) nanoparticle compositions may be used, solely, as a composite, or in conjunction with other building materials to control thermal gradients or heat inside and outside buildings.
   a. Coatings: A coating on glass or freestanding film/layer that would be applied between the inner walls of two glass panes. The targeted vanadium oxide ($VO_2$) nanoparticle composition deposited as a thin layer on glass would reject infrared energy or allow infrared energy to be transmitted through the glass, based on temperature and/or voltage.
   b. Applied Window Film: A freestanding polymer film that is adhered to windows after forming a flexible polymer film. Targeted vanadium oxide ($VO_2$) nanoparticle composition in a thin flexible polymer film layer would reject infrared energy or allow infrared energy to be transmitted through the widows or walls, based on temperature and/or voltage.
   c. Roofing and Siding Materials: A composite with targeted vanadium oxide ($VO_2$) nanoparticle compositions that acts to control heat gain in roofs and siding materials such as wood, water proof membranes, shingles, and vinyl siding.

2. Refrigeration: Due to the ability of $VO_2$ to actively reflect heat on demand, targeted vanadium oxide ($VO_2$) nanoparticle compositions can also be used in refrigeration to further reduce heat transfer into cooled spaces containing liquids, gases, or solids. Coatings could be developed that reflects solar hear away from refrigerated spaces, (i.e. trucks, rail cars, warehouses, and coolers) or that reflects heat away from spaces that are not refrigerated but need to remain cool (i.e. propane tanks, gas tanks, insulated containers, thermoses, drinks, etc.). These coatings are not producing refrigeration but aid in increasing the insulating factor of the refrigerated or cold item.

3. Paints and Resins: Paint and resin formulations containing targeted vanadium oxide ($VO_2$) nanoparticle compositions could control thermal gradients once applied, especially when used in automobile, building, and marine applications.

4. Textiles: The application of targeted vanadium oxide ($VO_2$) nanoparticle compositions to textiles would control heat in and out of items such as clothing, tents, and canopies.

5. Optics: The targeted vanadium oxide ($VO_2$) nanoparticle composition particles operate by sensing temperature via the phase transition. In devices with optical systems this sensing ability coupled with electronic MIT could be used in thermal imaging systems or in infrared cloaking applications.

6. Electronics: The physical structure phase transformations in vanadium oxides are often accompanied by electronic phase transitions wherein the MIT can cause the electrical conductivity to change by more than 5 orders of magnitude. MIT materials are often used in electronic devices for their "on" and "off" switch representing "1" and "0" in computers.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

What is claimed is:

1. A liquid delivery system for creating targeted vanadium oxide ($VO_2$) nanoparticle compositions comprising:
   a stock reaction mixture that is a liquid solution of at least one vanadium source combined with at least one dopant source, wherein each of said at least one dopant source contains at least one target dopant element, and wherein the ratio of the number of vanadium atoms in said vanadium source to the number of target dopant element atoms in said dopant source is less than or equal to 10:1; and
   a selected solvent that is compatible with said stock reaction mixture;
   wherein said solvent and said stock reaction mixture are maintained at an elevated pressure greater than atmospheric pressure and less than or equal to 5,000 psi via a back pressure regulator;
   the temperature of said solvent is maintained to between 50 and 500° C., and
   a continuous liquid flow of said stock reaction mixture is mixed with said solvent to heat said stock reaction mixture and initiate formation of the targeted vanadium oxide ($VO_2$) nanoparticle composition.

2. The system of claim 1 further comprising a chemical additive that is delivered subsequent to mixing said stock reaction mixture with said solvent.

3. The system of claim 1 further comprising:
   a chemical additive that is delivered subsequent to mixing said stock reaction mixture with said solvent; and
   the function of said chemical additive is selected from one of the group comprising surface treating the targeted vanadium oxide ($VO_2$) nanoparticle composition, halting formation of the targeted vanadium oxide ($VO_2$) nanoparticle composition, changing dispersability of the targeted vanadium oxide ($VO_2$) nanoparticle composition, limiting agglomeration of the targeted vanadium oxide ($VO_2$) nanoparticle composition, and encapsulating entirely or partially the targeted vanadium oxide ($VO_2$) nanoparticle composition with an additional material.

4. The system of claim 1 further comprising a cooling element located subsequent to mixing said stock reaction mixture with said solvent.

5. The system of claim 1 further comprising particle filters located subsequent to mixing said stock reaction mixture with said solvent.

6. The system of claim 1 further comprising particle filters with ultrasonic agitators located subsequent to mixing said stock reaction mixture with said solvent.

7. The system of claim 1 further comprising a reservoir to hold said stock reaction mixture prior to mixing with said solvent.

8. The system of claim 1 in which said at least one vanadium source is mixed with said at least one dopant source to create said stock reaction mixture prior to mixing with said solvent.

9. The system of claim 1 in which said solvent is any one of water, isopropanol, carbon dioxide, ethanol, toluene, anisole, ethylene glycol, methanol, and any combination thereof.

10. The system of claim 1 in which said at least one vanadium source is any one of vanadium (V) oxide, vanadium (IV) oxide, vanadium oxides, vanadium, vanadyls, vanadium oxalates, vanadium alkoxides, vanadium halides, vanadium nitrates, vanadium nitrites, vanadium sulfates, vanadium salts, and other vanadium containing compounds.

11. The system of claim 1 in which said at least one dopant source is silicon dioxide, silanes, manganese dioxide, tetraethyl orthosilicate, silicates, ammonium phosphate monobasic, ammonium phosphate dibasic, phosphoric acid, ammonium hydroxide, phosphorous containing acids, tungstic acid, tungsten alkoxides, tungsten halides, tungsten nitrates, tungsten nitrites, tungsten organometallic compounds, molybdic acid, molybdenum alkoxides, molybdenum halides, molybdenum nitrates, molybdenum nitrites, molybdenum organometallic compounds, titanium dioxide, titanium alkoxides, Tyzor™, titanium halides, titanium nitrates, titanium nitrites, titanium organometallic compounds, tin dioxide, tin salts, tin alkoxides, tin halides, tin nitrates, tin nitrites, tin organometallic compounds, iron oxide, iron alkoxides, iron halides, iron nitrates, iron nitrites, iron organometallic compounds, tin oxide, germanium oxide, germanium alkoxides, germanium organometallic compounds, germanium halides, germanium nitrates, germanium nitrites, dextrose, graphite, or graphene.

12. The system of claim 1 further comprising a reservoir to hold said stock reaction mixture adjusted to a pH range of 5 to 9 prior to mixing with said solvent.

13. The system of claim 1 in which the ratio of said solvent to said stock reaction mixture is greater than or equal to 1:2.

14. The system of claim 1 in which the targeted vanadium oxide ($VO_2$) nanoparticle composition comprises the general composition of $\alpha_x V_{1-x} O_2$, where $\alpha$ is a substitutional replacement of a cationic non-metal or metalloid element for a vanadium atom in the $VO_2$ nanoparticle, and $0<x<1$.

15. The system of claim 1 in which the targeted vanadium oxide ($VO_2$) nanoparticle composition comprises the general composition of $\alpha_x V_{1-x} O_2$, where $\alpha$ is selected from the group comprising silicon (Si), phosphorous (P), nitrogen (N), carbon (C), sulfur (S), germanium (Ge), tin (Sn), and any combination thereof, $\alpha$ is a substitutional replacement of a vanadium atom in the $VO_2$ nanoparticle, and $0<x<1$.

16. The system of claim 1 in which the said at least one target dopant element comprises an atomic concentration less than 20% of the targeted vanadium oxide ($VO_2$) nanoparticle composition.

17. The system of claim 1 in which the targeted vanadium oxide ($VO_2$) nanoparticle composition comprises the general composition of $\alpha_x \beta_y V_{1-x-y} O_2$, where $\alpha$ is a substitutional replacement of a cationic (positively charged) non-metal or metalloid element for a vanadium atom in the $VO_2$ nanoparticle, $\beta$ is another cationic metal or metalloid element that is a substitutional replacement of a another vanadium atom in the $VO_2$ nanoparticle, $0<x<1$, and $0<x+y<1$.

18. The system of claim 1 in which the targeted vanadium oxide ($VO_2$) nanoparticle composition comprises the general composition of $\alpha_x \beta_y V_{1-x-y} O_2$, where $\alpha$ is selected from the group comprising silicon (Si), phosphorous (P), nitrogen (N), carbon (C), sulfur (S), germanium (Ge), tin (Sn), and any combination thereof, $\alpha$ is a substitutional replacement of a vanadium atom in the $VO_2$ nanoparticle, $\beta$ is another cationic metal or metalloid element that is a substitutional replacement of a another vanadium atom in the $VO_2$ nanoparticle, $0<x<1$, and $0<x+y<1$.

19. The system of claim 1 in which the targeted vanadium oxide ($VO_2$) nanoparticle composition comprises the general composition of $\alpha_x \beta_y V_{1-x-y} O_2$, where $\alpha$ is a substitutional replacement of a cationic (positively charged) non-metal or metalloid element for a vanadium atom in the $VO_2$ nanoparticle and $\beta$ is selected from the group comprising tungsten (W), molybdenum (Mo), silver (Ag), nickel (Ni), lead (Pb), potassium (K), sodium (Na), cesium (Cs), strontium (Sr), barium (Ba), calcium (Ca), niobium (Nb), chromium (Cr), aluminum (Al), iron (Fe), titanium (Ti), zirconium (Zr), hafnium (Hf), tantalum (Ta), scandium (Sc), gallium (Ga), copper (Cu), cobalt (Co), gold (Au), tin (Sn), manganese (Mn), bismuth (Bi), rare-earth elements cations, or any combination thereof, β is a substitutional replacement of a another vanadium atom in the VO$_2$ nanoparticle, 0<x<1, and 0<x+y<1.

20. The system of claim 1 in which the targeted vanadium oxide (VO$_2$) nanoparticle composition comprises the general composition of $\alpha_x\beta_y V_{1-x-y}\gamma_z O_{2-z}$, where α is a substitutional replacement of a cationic (positively charged) non-metal or metalloid element for a vanadium atom in the VO$_2$ nanoparticle, β is a substitutional replacement of another cationic metal or metalloid element for another vanadium atom in the VO$_2$ nanoparticle, γ is a substitutional replacement of an anionic element for an oxygen atom, 0<x<1, 0<x+y<1, and 0<z<2.

21. The system of claim 1 in which the targeted vanadium oxide (VO$_2$) nanoparticle composition comprises the general composition of $\alpha_x\beta_y V_{1-x-y}\gamma_z O_{2-z}$, where α is selected from the group comprising silicon (Si), phosphorous (P), nitrogen (N), carbon (C), sulfur (S), germanium (Ge), tin (Sn), and any combination thereof, α is a substitutional replacement of a vanadium atom in the VO$_2$ nanoparticle, β is a substitutional replacement of another cationic metal or metalloid element for another vanadium atom in the VO$_2$ nanoparticle, γ is a substitutional replacement of an anionic element for an oxygen atom, 0<x<1, 0<x+y<1, and 0<z<2.

22. The system of claim 1 in which the targeted vanadium oxide (VO$_2$) nanoparticle composition comprises the general composition of $\alpha_x\beta_y V_{1-x-y}\gamma_z O_{2-z}$ where α is a substitutional replacement of a cationic (positively charged) non-metal or metalloid element for a vanadium atom in the VO$_2$ nanoparticle, β is selected from the group comprising tungsten (W), molybdenum (Mo), silver (Ag), nickel (Ni), lead (Pb), potassium (K), sodium (Na), cesium (Cs), strontium (Sr), barium (Ba), calcium (Ca), niobium (Nb), chromium (Cr), aluminum (Al), iron (Fe), titanium (Ti), zirconium (Zr), hafnium (Hf), tantalum (Ta), scandium (Sc), gallium (Ga), copper (Cu), cobalt (Co), gold (Au), tin (Sn), manganese (Mn), bismuth (Bi), rare-earth elements cations, or any combination thereof, β is a substitutional replacement of another vanadium atom in the VO$_2$ nanoparticle, γ is a substitutional replacement of an anionic element for an oxygen atom, 0<x<1, 0<x+y<1, and 0<z<2.

23. The system of claim 1 in which the targeted vanadium oxide (VO$_2$) nanoparticle composition comprises the general composition of $\alpha_x\beta_y V_{1-x-y}\gamma_z O_{2-z}$, where α is a substitutional replacement of a cationic (positively charged) non-metal or metalloid element for a vanadium atom in the VO$_2$ nanoparticle, β is a substitutional replacement of another cationic metal or metalloid element for another vanadium atom in the VO$_2$ nanoparticle, γ is selected from the group comprising nitrogen (N), phosphorous (P), Sulfur (S), fluorine (F), chlorine (Cl), bromine (Br), iodine (I), carbon (C), and any combination thereof, γ is a substitutional replacement of an anionic element for an oxygen atom, 0<x<1, 0<x+y<1, and 0<z<2.

24. The system of claim 1 in which the targeted vanadium oxide (VO$_2$) nanoparticle composition comprises the general composition of $\alpha_x V_{1-x}\gamma_z O_{2-z}$, where α is a substitutional replacement of a cationic (positively charged) non-metal or metalloid element for a vanadium atom in the VO$_2$ nanoparticle, γ is a substitutional replacement of an anionic element for an oxygen atom, 0<x<1, and 0<z<2.

25. The system of claim 1 in which the targeted vanadium oxide (VO$_2$) nanoparticle composition comprises the general composition of $\alpha_x V_{1-x}\gamma_z O_{2-z}$, where α is selected from the group comprising silicon (Si), phosphorous (P), nitrogen (N), carbon (C), sulfur (S), germanium (Ge), tin (Sn), and any combination thereof, α is a substitutional replacement of a vanadium atom in the VO$_2$ nanoparticle, γ is a substitutional replacement of an anionic element for an oxygen atom, 0<x<1, and 0<z<2.

26. The system of claim 1 in which the targeted vanadium oxide (VO$_2$) nanoparticle composition comprises the general composition of $\alpha_x V_{1-x}\gamma_z O_{2-z}$, where α is a substitutional replacement of a cationic (positively charged) non-metal or metalloid element for a vanadium atom in the VO$_2$ nanoparticle, γ is selected from the group comprising nitrogen (N), phosphorous (P), Sulfur (S), fluorine (F), chlorine (Cl), bromine (Br), iodine (I), carbon (C), and any combination thereof, γ is a substitutional replacement of an anionic element for an oxygen atom, 0<x<1, and 0<z<2.

27. The system of claim 1 in which the targeted vanadium oxide (VO$_2$) nanoparticle composition further comprises a secondary outer encapsulating layer.

28. The system of claim 1 configured to mix and form the targeted vanadium oxide (VO$_2$) nanoparticle composition in less than 60 minutes.

29. The system of claim 1 configured to mix and form the targeted vanadium oxide (VO$_2$) nanoparticle composition between 0 and 5 minutes.

30. A method of creating targeted vanadium oxide (VO$_2$) nanoparticle compositions comprising:
creating a stock reaction mixture that is a liquid combination of at least one vanadium source combined with at least one dopant source, wherein each of the at least one dopant source contains at least one target dopant element, and wherein the ratio of the number of vanadium atoms in the vanadium source to the number of target dopant element atoms in the dopant source is less than or equal to 10:1;
selecting a solvent that is compatible with the stock reaction mixture;
increasing the pressure of the stock reaction mixture to an at an elevated pressure greater than atmospheric pressure and less than or equal to 5,000 psi
increasing the pressure of the solvent to an elevated pressure above atmospheric and the temperature of the solvent to between 50 and 500° C.; and
in a continuously flowing system, mixing the stock reaction mixture with the solvent to heat the stock reaction mixture and initiate formation of the targeted vanadium oxide (VO$_2$) nanoparticle composition in less than 5 minutes.

31. The method of claim 30 in which the solvent is water, isopropanol, carbon dioxide, ethanol, toluene, anisole, ethylene glycol, or methanol.

32. The method of claim 30 in which the at least one vanadium source is vanadium (V) oxide, vanadium (IV) oxide, vanadium oxides, vanadium, vanadyls (VO(OR)$_x$), vanadium oxalates, vanadium alkoxides (V(OR)x), vanadium halides, vanadium nitrates, vanadium nitrites, vanadium sulfates, vanadium salts, or other vanadium containing compounds.

33. The method of claim 30 in which the at least one dopant source is silicon dioxide, silanes, manganese dioxide, tetraethyl orthosilicate, silicates, ammonium phosphate monobasic, ammonium phosphate dibasic, phosphoric acid, ammonium hydroxide, phosphorous containing acids, tungstic acid, tungsten alkoxides, tungsten halides, tungsten nitrates, tungsten nitrites, tungsten organometallic compounds, molybdic acid, molybdenum alkoxides, molybdenum halides, molybdenum nitrates, molybdenum nitrites, molybdenum organometallic compounds, titanium dioxide, titanium alkoxides, Tyzor™, titanium halides, titanium nitrates, titanium nitrites, titanium organometallic compounds, tin dioxide, tin salts, tin alkoxides, tin halides, tin nitrates, tin nitrites, tin organometallic compounds, iron oxide, iron alkoxides, iron halides, iron nitrates, iron nitrites, iron organometallic compounds, tin oxide, germanium oxide, germanium alkoxides, germanium organometallic compounds, germanium halides, germanium nitrates, germanium nitrites, dextrose, graphite, or graphene.

34. The method of claim 30 in which the pH of the stock reaction mixture is adjusted to a range of 5 to 9.

35. The method of claim 30 in which the ratio of the solvent to the stock reaction mixture when mixing the stock reaction mixture with the solvent is greater than or equal to 1:2.

36. The method of claim 30 in which the targeted vanadium oxide ($VO_2$) nanoparticle composition comprises the general composition of $\alpha_x V_{1-x} O_2$, where $\alpha$ is a cationic non-metal or metalloid element that substitutionally replaces a vanadium atom in the $VO_2$ nanoparticle, and $0<x<1$.

37. The method of claim 30 in which the targeted vanadium oxide ($VO_2$) nanoparticle composition comprises the general composition of $\alpha_x V_{1-x} O_2$, where $\alpha$ is selected from the group comprising silicon (Si), phosphorous (P), nitrogen (N), carbon (C), sulfur (S), germanium (Ge), tin (Sn), and any combination thereof, a substitutionally replaces a vanadium atom in the $VO_2$ nanoparticle, and $0<x<1$.

38. The method of claim 30 in which the at least one target dopant element comprises an atomic concentration less than 20% of the targeted vanadium oxide ($VO_2$) nanoparticle composition.

39. The method of claim 30 in which the targeted vanadium oxide ($VO_2$) nanoparticle composition comprises the general composition of $\alpha_x \beta_y V_{1-x-y} O_2$, where $\alpha$ is a cationic (positively charged) non-metal or metalloid element that substitutionally replaces a vanadium atom in the $VO_2$ nanoparticle, $\beta$ is another cationic metal or metalloid element that substitutionally replaces another vanadium atom in the $VO_2$ nanoparticle, $0<x<1$, and $0<x+y<1$.

40. The method of claim 30 in which the targeted vanadium oxide ($VO_2$) nanoparticle composition comprises the general composition of $\alpha_x \beta_y V_{1-x-y} O_2$, where $\alpha$ is selected from the group comprising silicon (Si), phosphorous (P), nitrogen (N), carbon (C), sulfur (S), germanium (Ge), tin (Sn), and any combination thereof, a substitutionally replaces a vanadium atom in the $VO_2$ nanoparticle, $\beta$ is another cationic metal or metalloid element that substitutionally replaces another vanadium atom in the $VO_2$ nanoparticle, $0<x<1$, and $0<x+y<1$.

41. The method of claim 30 in which the targeted vanadium oxide ($VO_2$) nanoparticle composition comprises the general composition of $\alpha_x \beta_y V_{1-x-y} O_2$, where $\alpha$ is a cationic (positively charged) non-metal or metalloid element that substitutionally replaces a vanadium atom in the $VO_2$ nanoparticle and $\beta$ is selected from the group comprising tungsten (W), molybdenum (Mo), silver (Ag), nickel (Ni), lead (Pb), potassium (K), sodium (Na), cesium (Cs), strontium (Sr), barium (Ba), calcium (Ca), niobium (Nb), chromium (Cr), aluminum (Al), iron (Fe), titanium (Ti), zirconium (Zr), hafnium (Hf), tantalum (Ta), scandium (Sc), gallium (Ga), copper (Cu), cobalt (Co), gold (Au), tin (Sn), manganese (Mn), bismuth (Bi), rare-earth elements cations, or any combination thereof, $\beta$ substitutionally replaces another vanadium atom in the $VO_2$ nanoparticle, $0<x<1$, and $0<x+y<1$.

42. The method of claim 30 in which the targeted vanadium oxide ($VO_2$) nanoparticle composition comprises the general composition of $\alpha_x \beta_y V_{1-x-y} \gamma_z O_{2-z}$, where $\alpha$ is a cationic (positively charged) non-metal or metalloid element that substitutionally replaces a vanadium atom in the $VO_2$ nanoparticle, $\beta$ is another cationic metal or metalloid element that substitutionally replaces another vanadium atom in the $VO_2$ nanoparticle, $\gamma$ is an anionic element that substitutionally replaces an oxygen atom, $0<x<1$, $0<x+y<1$, and $0<z<2$.

43. The method of claim 30 in which the targeted vanadium oxide (VO2) nanoparticle composition comprises the general composition of $\alpha_x \beta_y V_{1-x-y} \gamma_z O_{2-z}$, where $\alpha$ is selected from the group comprising silicon (Si), phosphorous (P), nitrogen (N), carbon (C), sulfur (S), germanium (Ge), tin (Sn), and any combination thereof, $\alpha$ substitutionally replaces a vanadium atom in the $VO_2$ nanoparticle, $\beta$ is another cationic metal or metalloid element that substitutionally replaces another vanadium atom in the $VO_2$ nanoparticle, $\gamma$ is an anionic element that substitutionally replaces an oxygen atom, $0<x<1$, $0<x+y<1$, and $0<z<2$.

44. The method of claim 30 in which the targeted vanadium oxide ($VO_2$) nanoparticle composition comprises the general composition of $\alpha_x \beta_y V_{1-x-y} \gamma_z \beta_{2-z}$, where $\alpha$ is a cationic (positively charged) non-metal or metalloid element that substitutionally replaces a vanadium atom in the $VO_2$ nanoparticle, $\beta$ is selected from the group comprising tungsten (W), molybdenum (Mo), silver (Ag), nickel (Ni), lead (Pb), potassium (K), sodium (Na), cesium (Cs), strontium (Sr), barium (Ba), calcium (Ca), niobium (Nb), chromium (Cr), aluminum (Al), iron (Fe), titanium (Ti), zirconium (Zr), hafnium (Hf), tantalum (Ta), scandium (Sc), gallium (Ga), copper (Cu), cobalt (Co), gold (Au), tin (Sn), manganese (Mn), bismuth (Bi), rare-earth elements cations, or any combination thereof, $\beta$ substitutionally replaces another vanadium atom in the $VO_2$ nanoparticle, $\gamma$ is an anionic element that substitutionally replaces an oxygen atom, $0<x<1$, $0<x+y<1$, and $0<z<2$.

45. The method of claim 30 in which the targeted vanadium oxide ($VO_2$) nanoparticle composition comprises the general composition of $\alpha_x \beta_y V_{1-x-y} \gamma_z O_{2-z}$, where $\alpha$ is a cationic (positively charged) non-metal or metalloid element that substitutionally replaces a vanadium atom in the $VO_2$ nanoparticle, $\beta$ is another cationic metal or metalloid element that substitutionally replaces another vanadium atom in the $VO_2$ nanoparticle, $\gamma$ is selected from the group comprising nitrogen (N), phosphorous (P), Sulfur (S), fluorine (F), chlorine (Cl), bromine (Br), iodine (I), carbon (C), and any combination thereof, $\gamma$ is an anionic element that substitutionally replaces an oxygen atom, $0<x<1$, $0<x+y<1$, and $0<z<2$.

46. The method of claim 30 in which the targeted vanadium oxide ($VO_2$) nanoparticle composition further comprises a secondary outer encapsulating layer.

47. The method of claim 30 in which the targeted vanadium oxide ($VO_2$) nanoparticle composition comprises the general composition of $\alpha_x V_{1-x} \gamma_z O_{2-z}$, where $\alpha$ is a cationic (positively charged) non-metal or metalloid element that substitutionally replaces a vanadium atom in the $VO_2$ nanoparticle, $\gamma$ is an anionic element that substitutionally replaces an oxygen atom, $0<x<1$, and $0<z<2$.

48. The method of claim 30 in which the targeted vanadium oxide ($VO_2$) nanoparticle composition comprises the general composition of $\alpha_x V_{1-x} \gamma_z O_{2-z}$, where $\alpha$ is selected from the group comprising silicon (Si), phosphorous (P), nitrogen (N), carbon (C), sulfur (S), germanium (Ge), tin (Sn), and any combination thereof, $\alpha$ substitutionally replaces a vanadium atom in the $VO_2$ nanoparticle, $\gamma$ is an anionic element that substitutionally replaces an oxygen atom, $0<x<1$, and $0<z<2$.

49. The method of claim 30 in which the targeted vanadium oxide ($VO_2$) nanoparticle composition comprises the general composition of $\alpha_x V_{1-x} \gamma_z O_{2-z}$, where $\alpha$ is a cationic (positively charged) non-metal or metalloid element that substitutionally replaces a vanadium atom in the VO2 nanoparticle, $\gamma$ is selected from the group comprising nitrogen (N), phosphorous (P), Sulfur (S), fluorine (F), chlorine (Cl), bromine (Br), iodine (I), carbon (C), and any combination thereof, $\gamma$ is an anionic element that substitutionally replaces an oxygen atom, $0<x<1$, and $0<z<2$.

* * * * *